United States Patent [19]

McNeel et al.

[11] Patent Number: 4,682,831
[45] Date of Patent: Jul. 28, 1987

[54] MULTIPLE-CONTACT CONNECTOR ASSEMBLY

[75] Inventors: William O. McNeel; Royel F. Montieth; Stephen E. Scott, all of Houston, Tex.

[73] Assignee: Litton Resources Systems, Inc., Alvin, Tex.

[21] Appl. No.: 357,459

[22] Filed: Mar. 12, 1982

[51] Int. Cl.⁴ .................. H01R 25/00; H01R 4/70
[52] U.S. Cl. ................................. 439/294; 439/277
[58] Field of Search .................. 339/47, 48, 49, 60, 339/90, 94

[56] References Cited

U.S. PATENT DOCUMENTS

| | | | |
|---|---|---|---|
| 2,605,315 | 7/1952 | Hargett | 339/94 M |
| 2,757,355 | 7/1956 | Howes et al. | 339/94 M |
| 2,960,675 | 11/1960 | Hansen | 339/49 R |
| 2,987,691 | 6/1961 | Ross | 339/49 R |
| 3,086,188 | 4/1963 | Ross | 339/49 R |
| 3,321,733 | 5/1967 | Thomas | 339/90 R |
| 3,745,511 | 7/1973 | Russell | 339/90 R |
| 4,037,902 | 7/1977 | Miller | 339/49 R |
| 4,166,663 | 9/1979 | Walker et al. | 339/49 B |
| 4,398,781 | 8/1983 | Dan | 339/94 M |

FOREIGN PATENT DOCUMENTS

| | | | |
|---|---|---|---|
| 6704817 | 10/1967 | Netherlands | 339/90 R |
| 770307 | 3/1957 | United Kingdom | 339/94 R |

OTHER PUBLICATIONS

Hughes "RUF-NEK" publication, Form CD107-2-2172.

Primary Examiner—Gil Weidenfeld
Assistant Examiner—Gary F. Paumen
Attorney, Agent, or Firm—E. Eugene Thigpen; William A. Knox

[57] ABSTRACT

A cable-entry seal for a multicontact seismic cable connector consists of a cable anchor molded near an end of a multiconductor cable and a sphincter grommet. A compression sleeve, urged by a gland nut axially compresses the sphincter causing it to expand radially to form a water tight seal. A rotatable locking cam has a spiral slot lined with a low friction material to lock a pair of cable connectors together.

5 Claims, 6 Drawing Figures

MULTIPLE-CONTACT CONNECTOR ASSEMBLY

BACKGROUND OF THE INVENTION

1. Field of the Invention

This invention relates to a cable-entry seal for use with multiple-contact connector plugs such as are used with multiconductor seismic land cables.

2. Discussion of the Prior Art

In seismic exploration on land, many hundreds of acoustic detectors are emplaced upon the ground along a line of survey. The detectors are connected to a multichannel recording unit where the seismic signals from the various detectors are processed and recorded, usually on magnetic tape.

Seismic signals from the detectors are transmitted to the recordintg unit through long multiconductor cables. The number of conductors contained within a cable varies as the number of detectors to be serviced. Fifty to two hundred conductor pairs enclosed by an outer flexible jacket are commonly used. Because the number of conductors per cable varies somewhat, so also do the physical sizes of the cables vary. Typically the outside cable diameter may range from well under one-half inch to nearly one inch.

The cable laid out at any given time may extend for two miles or more. Necessarily therefore, the total cable is divided into shorter more readily manageable sections 100 to 200 feet long. The cable sections are terminated at each end by mating multicontact connectors. The connectors are generally non-polarized, hermaphroditic devices so that either end of any cable section will mate with any other cable section.

Multicontact connectors present two problems. First, mating connectors are physically very difficult to couple and uncouple because of the friction offered by the several hundred spring-metal contacts that must be securely mated. The two mating connector assemblies must be securely latched in place and must be reasonably waterproof.

Second, at the cable entry port where the multiconductor cable enters the body of the plug, a water-tight seal must be created around the cable and additionally the cable must be properly anchored into the plug. Usually, some form of rubber or Neoprene packing is compressed around the cable, in a packing box, by a gland nut. Often, when the packing is tight enough to anchor the cable and to form a water-tight seal, the packing extrudes between the collar of the gland nut and the cable jacket. Further, since many differently-sized cables are in general use, a large inventory of differently-sized packing material must be maintained. Descriptions of typical multicontact connectors used for seismic operations may be found in U.S. Pat. Nos. 4,166,663; 2,987,691; 3,086,188; 3,745,511 and Canadian Patent No. 881,128; as well as co-pending U.S. patent application Ser. No. 328,037 assigned to the assignee of this invention.

SUMMARY OF THE INVENTION

It is an object of this invention to provide a hermaproditic multicontact cable-connector-half assembly that is mateable with another identical half assembly. A low-friction, rotatable locking cam holds the mating assemblies in position.

It is another object of this invention to provide a single standardized cable-sealing grommet assembly that will accommodate cables of divers diameters and that is simple in design.

In accordance with an aspect of this invention, we provide a cable-connector-half assembly including a hollow, rectangular, box-like case in which are mounted sets of male and female contacts. A cable entry port is cut in one wall of the case. A first anti-rotation locking means is molded around the cable entry port on the outside of the connector case. A hollow elongated neck, enclosing the locking means, extends outwardly from the connector case at the cable entry port. A cable anchor is molded to a multiconductor cable near an end thereof. The anchor has a front face that includes second locking means mateable with first locking means. The anchor also has a rear collar that has a fixed outer diameter, regardless of the diameter of the cable to which the anchor is moulded. A sphincter grommet fits snugly over the anchor collar. The outer diameter of the grommet is substantially the same as the inner diameter of the hollow neck. A rigid compression sleeve, urged by a gland nut that threadably engages the outer end of the neck, applies axial compression to the sphincter grommet, causing it to expand radially between the inner wall of the neck and the anchor collar. A reinforcing boot having a stepped inner diameter surrounds the cable and is held in place by the gland nut.

In accordance with another aspect of this invention, a nib is moulded to the outer wall of the connector case at the end opposite the cable entry port. A rotatable cam having a spiral slot on its front face is mounted on the neck between the outer wall of the connector case and the gland nut. A low-friction insert is securely fastened inside the spiral slot. When two connector-plug-half assemblies are mated, the nib of one assembly is engaged by the low friction insert of the cam of the opposite mating assembly. Rotation of the cams draws together and locks the two half assemblies.

BRIEF DESCRIPTION OF THE DRAWINGS

The benefits and objectives of our invention may best be appreciated by reference to the appended Detailed Description and the drawings wherein.

DETAILED DESCRIPTION OF THE INVENTION

Figure 1:
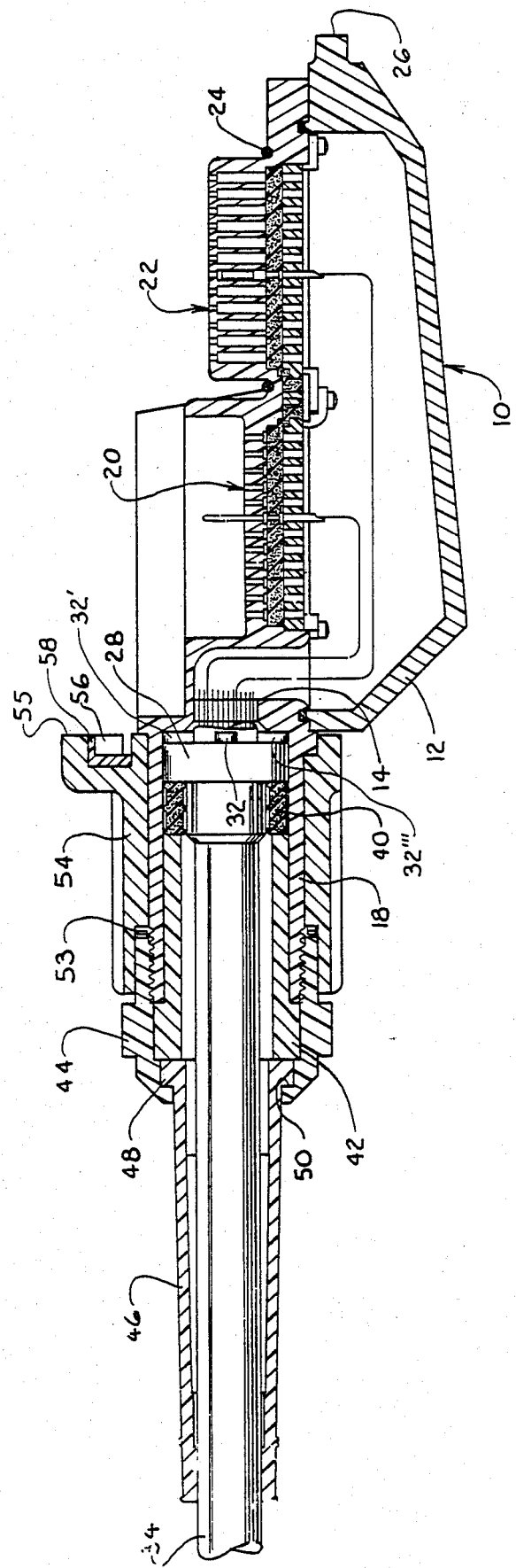
FIG. 1 is a cross section of a multicontact cable connector half-assembly.

Referring now to FIG. 1 there is shown in cross section, a multicontact cable connector-plug-half assembly 10 for use in connecting together two sections of a multiconductor seismic cable. Throughout this disclosure, the term multiconductor or multicontact is defined to mean a cable or a connector plug having 25 or more conductor pairs (50 conductors) and corresponding plug contacts. That distinction is made because of the special problems that arise in water proofing and making facile, reliable electrical contact, between mating plugs having hundreds of contacts as opposed to plugs having only a dozen contacts or less.

Figure 2:
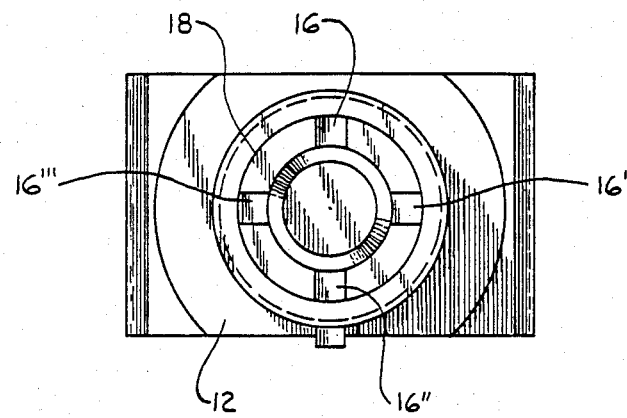
FIG. 2 is an end view of the cable entry port.
Figure 3:
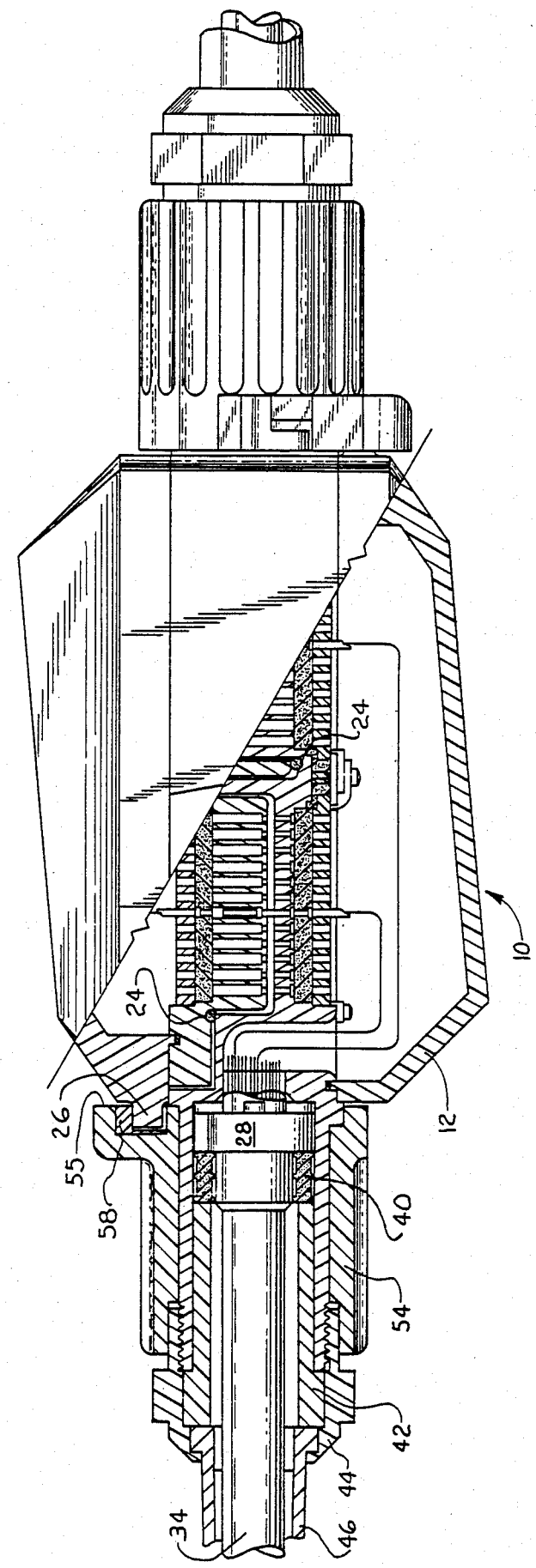
FIG. 3 illustrates two connector-half assemblies mated together.

The connector 10 consists of rectangular box-like case 12 with a cable entry port 14 in one wall of the case. A first anti-rotation locking means such as a pattern of detents 16, 16', 16", 16"', which may take the form of radial slots (FIG. 2) is molded in the outer wall surface of case 12. Case 12 may be molded from any desired rigid, tough plastic such as a plastic of the polycarbonate genus. A hollow cylindrical neck 18 extends outwardly from the wall of case 12, surrounding the detents. Inside the case there is mounted two sets of contacts 20 and 22, one set of which includes male contacts and the other set includes female contacts. An O-ring 24 surrounds the female contact set so that when mated with another plug, a waterproof seal is formed as shown in FIG. 3. The contact sets and their arrangement inside the connector case are conventional and per se, form no part of this invention. A nib 26 is molded at one end of the connector case on the end opposite the cable entry port 14. As will be described later, nib 26 forms part of the locking mechanism.

Figure 4:
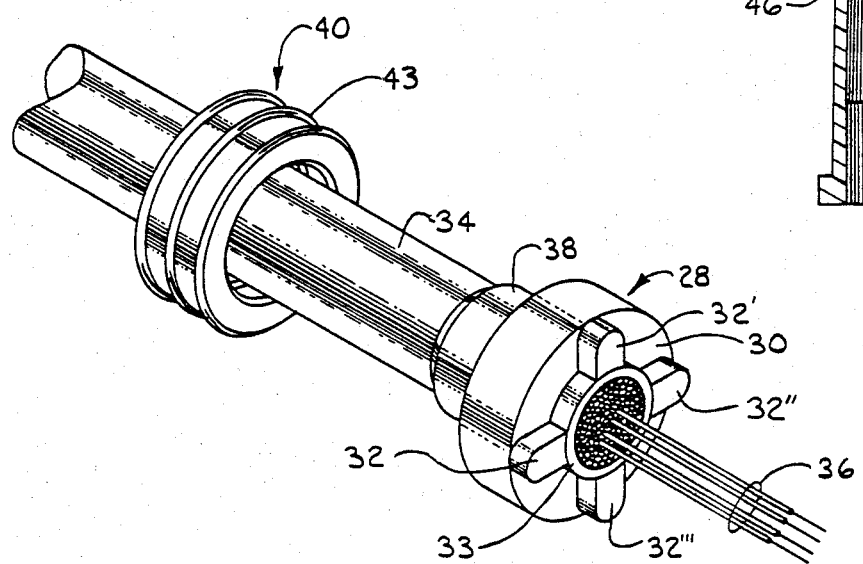
FIG. 4 is a detailed view of the cable anchor and sphincter grommet.

The cable sealing assembly is illustrated in FIGS. 1 and 4. A cable anchor 28 having a front surface 30, including second anti-rotation locking means such as a pattern of protruding nibs 32, 32', 32", 32"' is molded to the jacket 33 of a multiconductor cable 34 near an end thereof. The cable anchor is adapted to be inserted into the neck 18 so that the protruding nibs engage the detents. The individual conductors such as 36 are then inserted through cable entry port 14 where they may be fanned out inside case 12 to the respective contacts of sets 20 and 22. Cable anchor 28 has a rear collar 38 that has a fixed diameter, regardless of the outer diameter of the jacket of cable 34. The outer diameter of cable 34 depends, of course, upon the number of conductors contained inside the jacket and may vary over a wide range from about $\frac{3}{8}$" to $\frac{7}{8}$". A sphincter 40, having one or more raised rings such as 43 fits snugly over collar 38. The diameter of sphincter grommet 40 is substantially the same as the inside diameter of neck 18. The term "snugly" is here used in the ordinary dictionary meaning viz: the closest fit for two parts that are to be assembled by hand that are not to move relatively to each other. Sphincter 40 is molded of relatively soft Neoprene having a Durometer reading of 45. On the other hand, cable anchor 28 is molded of a much harder Neoprene having a Durometer reading of 90.

Returning now to FIG. 1, sphincter 40 and cable anchor 28 are held in place by rigid compression sleeve 42. A gland nut 44 threadably engages the outboard end of neck 18. A cable boot 46, has an outer shoulder 48 that fits under a mating inner shoulder 50 at one end of gland nut 44, between the gland nut shoulder and the end of compression sleeve 42. When gland nut 44 is tightened against boot shoulder 48, an axial compressive force is applied to sphincter 40 by compression sleeve 42. The applied axial force necessarily causes sphincter 40 to expand radially against collar 38 as shown in FIG. 4 of cable anchor 28 and against the internal wall of hollow neck 18, thereby effecting a water-tight seal in the cable entry port.

Figure 5:
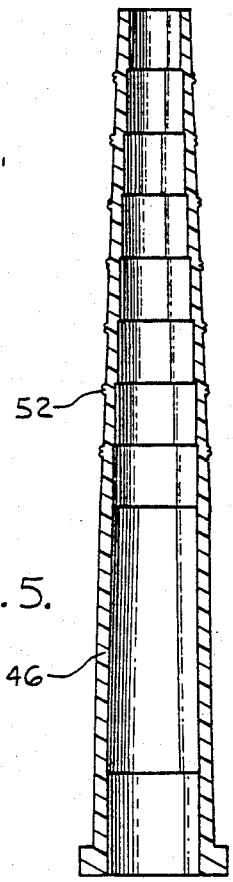
FIG. 5 is a detailed cross section of the cable boot.

Boot 46 serves to prevent cable 34 from flexing sharply at the entry point of the cable to the connector assembly around the gland nut. The details of tapered boot 46 are shown in FIG. 5. Smoothly tapered on the outside, the boot has an interior surface that is stepped down from a larger diameter to a smaller diameter as shown in the FIG. 1. Each step has a diameter corresponding to a different nominal cable diameter in increments of, for example, 0.040". The internal steps may be marked externally by markers such as 52. The boot may be fitted to a cable having any given diameter but cutting off excess boot material at the tapered end, at the external marking that corresponds most closely to the actual cable diameter. When fitted to a particular cable, the boot also serves as an additional water resistant sheath to minimize moisture invasion.

Figure 6:
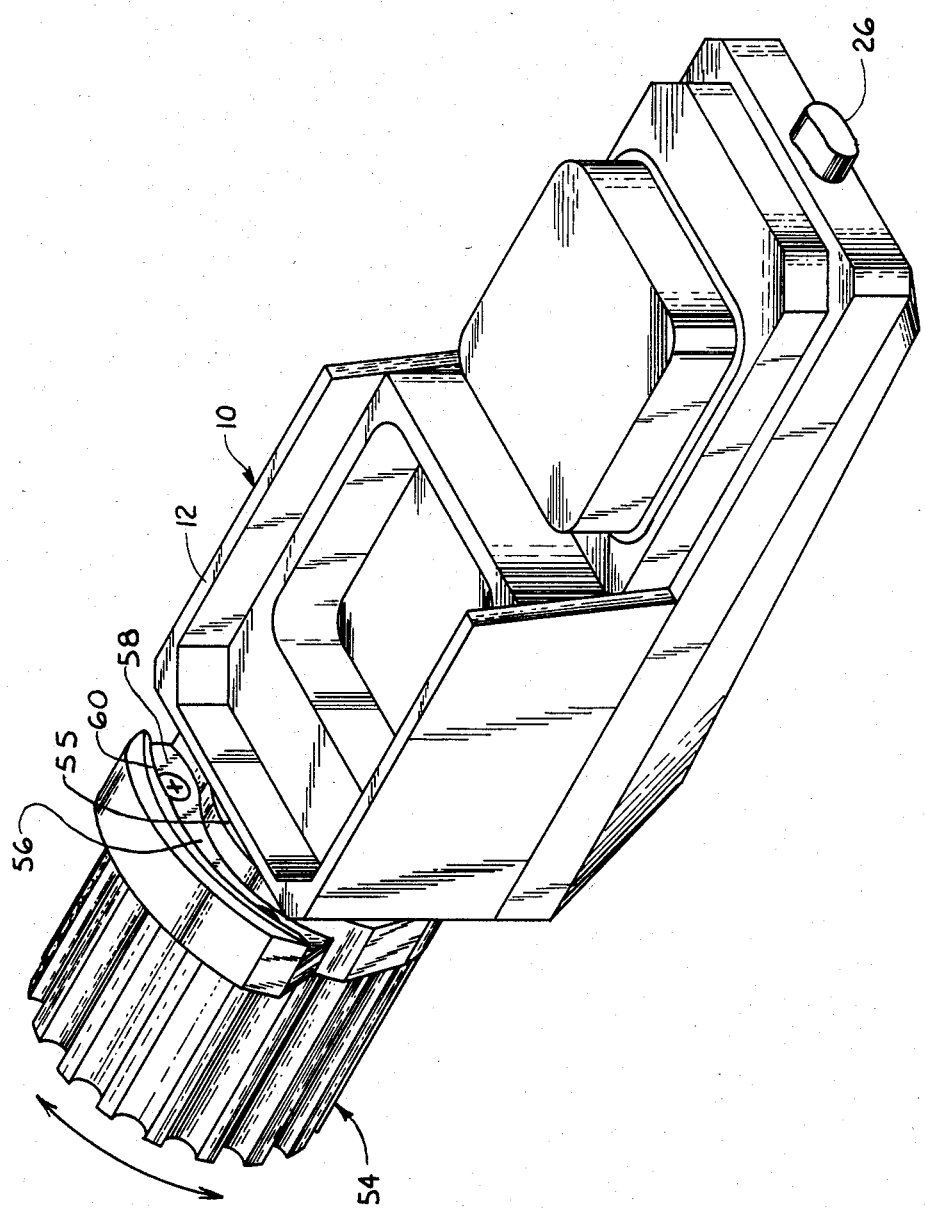
FIG. 6 is an isometric view of the locking cam assembly.

A rotatable locking cam 54 (FIG. 1) having a front face 55 is mounted externally around neck 18. Cam 54 is mounted between the external end wall of connector case 12 and gland nut 44. A one-turn, flat helical spring or a wavy washer such as 53 fits between gland nut 44 and the outboard end of locking cam 54 to apply a small amount of friction to the cam and to remove end play. Cam 54 is freely manually rotatable. A spiral slot 56 is milled in the front face of the cam. Refer to FIG. 6. A slotted or grooved insert 58 of a low friction material such as Nylatron brand of nylon, made by Polymer Corporation, Reading, Pa. is secured inside slot 56.

In use, when a pair of connector-plug-half assemblies are mated, the nib 26 of one assembly is engaged by slotted insert 58 of the cam of the opposite assembly as shown in FIG. 3. Rotation in a clockwise direction of the cams of the two assemblies draws the two assemblies together and locks them in place. Locking action is provided by a detent 60 (FIG. 6) in the insert 58, which engages the nib 26 at the extreme end of the rotational excursion of cam 54. Rotation of the cams counterclockwise forces the two half-assemblies apart against the friction offered by the mating contacts.

To summarize the operation of assembling the cable sealing assembly in connector 10 as shown in FIG. 1, a cable anchor 28 is molded near the end of a selected cable. The sphincter 40 is slipped over the rear collar 38 and the parts are inserted into the hollow neck 18 until the protruding nibs 32–32"' engage detents 16–16"'. The free end of the cable is of course inserted through the cable entry port so that the individual conductors may be soldered to the respective contacts. Rotatable locking cam 54 and tensioning means 53 are fitted over the outside of neck 18. Compression sleeve 42 is placed inside neck 18 just in front of boot 46. Finally, gland nut 44 is fitted over the assembly and screwed into place. In the event that the cable is quite long, locking cam 54 is mounted on neck 18 first. The gland nut, boot, compression sleeve and sphincter are then slipped back over the cable. Thereafter, the cable end is placed in a mold to receive the cable anchor. After that process, the parts of the sealing assembly are moved into place as above described.

We claim as our invention:
1. A hermaphroditic, multicontact connector half assembly for sealably receiving any one of a number of different multiconductor jacketed cables of divers diameters, said connector half assembly including a box-like case having walls, for receiving therewithin a set each of male and female connector contacts and a fanout of the individual wires of the multiconductor cable that are to be connected to said contacts, the connector-half assembly comprising:
    a cable entry port in a first wall of the case for receiving an end of a multiconductor cable, the entry port including first locking means on the outer surface of the first wall and a hollow elongated neck having inner and outer walls surrounding the entry port and the first locking means;

an anchor molded to said cable near an end thereof, adapted for insertion in said neck, the anchor having a front face that bears a second locking means matable with said first locking means for engagement with said first locking means, said anchor including a rear collar having a fixed outer diameter regardless of the diameter of said cable;

a sphincter snugly seated around the collar of said cable anchor; and means for compressing said sphincter to force said sphincter to expand radially in sealing engagement between the inner wall of said hollow neck and the rear collar of said anchor.

2. The connector half-assembly as defined by claim 1, comprising:

a nib molded at the end of the case opposite the cable entry port;

a rotatable locking cam having a front face mounted on said cylindrical neck between the first wall of the case and a portion of said means for compressing said sphincter;

a spiral slot cut in the front face of said cam; and a slotted low-friction insert secured in said slot for engaging the nib of a mating half-assembly.

3. The connector half-assembly as defined by claim 1, wherein said first locking means consists of a plurality of detents radially disposed relative to said entry port; and said second locking means consists of a plurality of radially disposed protruding nibs molded on the front face of said anchor.

4. The connector half housing as defined by claim 2, wherein:

said slotted low-friction insert is a nylon material.

5. The connector half housing as defined by claim 1, wherein:

said sphincter has a durometer hardness of at least 45; and said anchor has a durometer hardness of at least 90.

* * * * *